US011664987B2

(12) United States Patent
Gupta et al.

(10) Patent No.: US 11,664,987 B2
(45) Date of Patent: May 30, 2023

(54) UPDATING PUBLIC KEY CERTIFICATES IN NETWORK DEVICES USING A BLOCKCHAIN NETWORK

(71) Applicant: HEWLETT PACKARD ENTERPRISE DEVELOPMENT LP, Houston, TX (US)

(72) Inventors: Gopal Gupta, Bangalore (IN); Nagendra Babu Rapaka, Bangalore (IN); Abhinesh Mishra, Bangalore (IN); Amit Agrawal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 200 days.

(21) Appl. No.: 17/079,718

(22) Filed: Oct. 26, 2020

(65) Prior Publication Data
US 2022/0131691 A1   Apr. 28, 2022

(51) Int. Cl.
*H04L 9/08* (2006.01)
*H04L 9/32* (2006.01)
*H04L 9/00* (2022.01)

(52) U.S. Cl.
CPC ......... *H04L 9/0891* (2013.01); *H04L 9/0894* (2013.01); *H04L 9/3265* (2013.01); *H04L 9/3268* (2013.01); *H04L 9/50* (2022.05)

(58) Field of Classification Search
None
See application file for complete search history.

(56) References Cited

U.S. PATENT DOCUMENTS

| 8,656,490 B1* | 2/2014 | Sobel | H04L 63/0823 709/227 |
|---|---|---|---|
| 2012/0290878 A1* | 11/2012 | Gladwin | G06F 11/0793 714/48 |
| 2018/0034646 A1* | 2/2018 | Kuramoto | H04L 9/3268 |
| 2018/0063076 A1* | 3/2018 | Field | H04L 63/08 |

(Continued)

OTHER PUBLICATIONS

Kubilay et al., "CertLedger: A New PKI Model with Certificate Transparency Based on Blockchain", Oct. 1, 2018, pp. 1-17, downloaded from the Internet on Jun. 27, 2022, URL: https://arxiv.org/pdf/1806.03914.pdf (Year: 2018).*

(Continued)

*Primary Examiner* — Linglan Edwards
*Assistant Examiner* — Vy H Ho
(74) *Attorney, Agent, or Firm* — Hewlett Packard Enterprise Patent Department

(57) ABSTRACT

Examples relate to a BC network including a plurality of network devices deployed in a network. The plurality of network devices includes an authoritative network device that generates a transaction in a distributed ledger. The transaction includes location information of a new public key certificate to be deployed in each of the network devices. In order to verify the transaction, a network device of the plurality of network devices verifies, using a smart contract, whether the new public key certificate is valid and whether the new public key certificate is different from a previously recorded public key certificate in the distributed ledger. In response to successful verification by at least a predefined number of network devices of the plurality of network devices, each of the network device record the transaction in the distributed ledger.

20 Claims, 6 Drawing Sheets

(56) References Cited

U.S. PATENT DOCUMENTS

| | | | | |
|---|---|---|---|---|
| 2019/0173873 | A1* | 6/2019 | Brown | H04L 9/3239 |
| 2019/0361917 | A1 | 11/2019 | Tran et al. | |
| 2019/0373472 | A1 | 12/2019 | Smith et al. | |
| 2020/0021447 | A1* | 1/2020 | Ih | H04L 9/007 |
| 2020/0084097 | A1* | 3/2020 | Marks | G06Q 20/38215 |
| 2020/0403996 | A1* | 12/2020 | Parimi | H04L 63/102 |
| 2021/0364648 | A1* | 11/2021 | Rakshit | G01S 19/258 |

OTHER PUBLICATIONS

Ahmed et al., "Turning trust around: Smart Contract_assisted Public Key Infrastructure", 2018, pp. 1-8, download from the Internet on Jun. 27, 2022, URL: https://media.voog.com/0000/0042/0957/files/IEEE_TrustCom-18_paper_267.pdf (Year: 2018).*

Ahmed et al., "Turning trust around: Smart Contract_assisted Public Key Infrastructure", 2018, p. 1, downloaded from the Internet on Jun. 27, 2022, URL: https://patents.google.com/scholar/1890099984440871282 (Year: 2018).*

Nanopoulos, S., "Código Network: A Decentralized Firmware Update Framework for IoT Devices," Thesis Master of Science School of Informatics, University of Edinburgh, Jan. 2018, https://project-archive.inf.ed.ac.uk/msc/20182632/msc_proj.pdf.

Westerlund, M. et al., "Version Control Using Distributed Ledger Technologies for Internet of Things Device Software Updates," Cloud Computing: The Tenth International Conference on Cloud Computing, GRIDs, and Virtualization, May 5, 2015, pp. 43-48, http://thinkmind.org/download.php?articleid=cloud_computing_2019_4_20_28015.

Yohan, A. et al., "Blockchain-based Firmware Update Framework for Internet-of-Things Environment," Int'l Conf. Information and Knowledge Engineering, 2018, pp. 151-155, https://search.proquest.com/docview/2139456039/88BB8E97CCCD446FPQ/1?accountid=142944.

* cited by examiner

UPDATING PUBLIC KEY CERTIFICATES IN NETWORK DEVICES USING A BLOCKCHAIN NETWORK

BACKGROUND

A network deployment may include many network devices such as access points. When a network is initially deployed, potentially hundreds or thousands of network devices must be configured before the network is operational. These network devices need to be configured, for example to apply network identifiers, security settings, and other parameters that may be desired for the deployment site.

DETAILED DESCRIPTION

Figure 1:
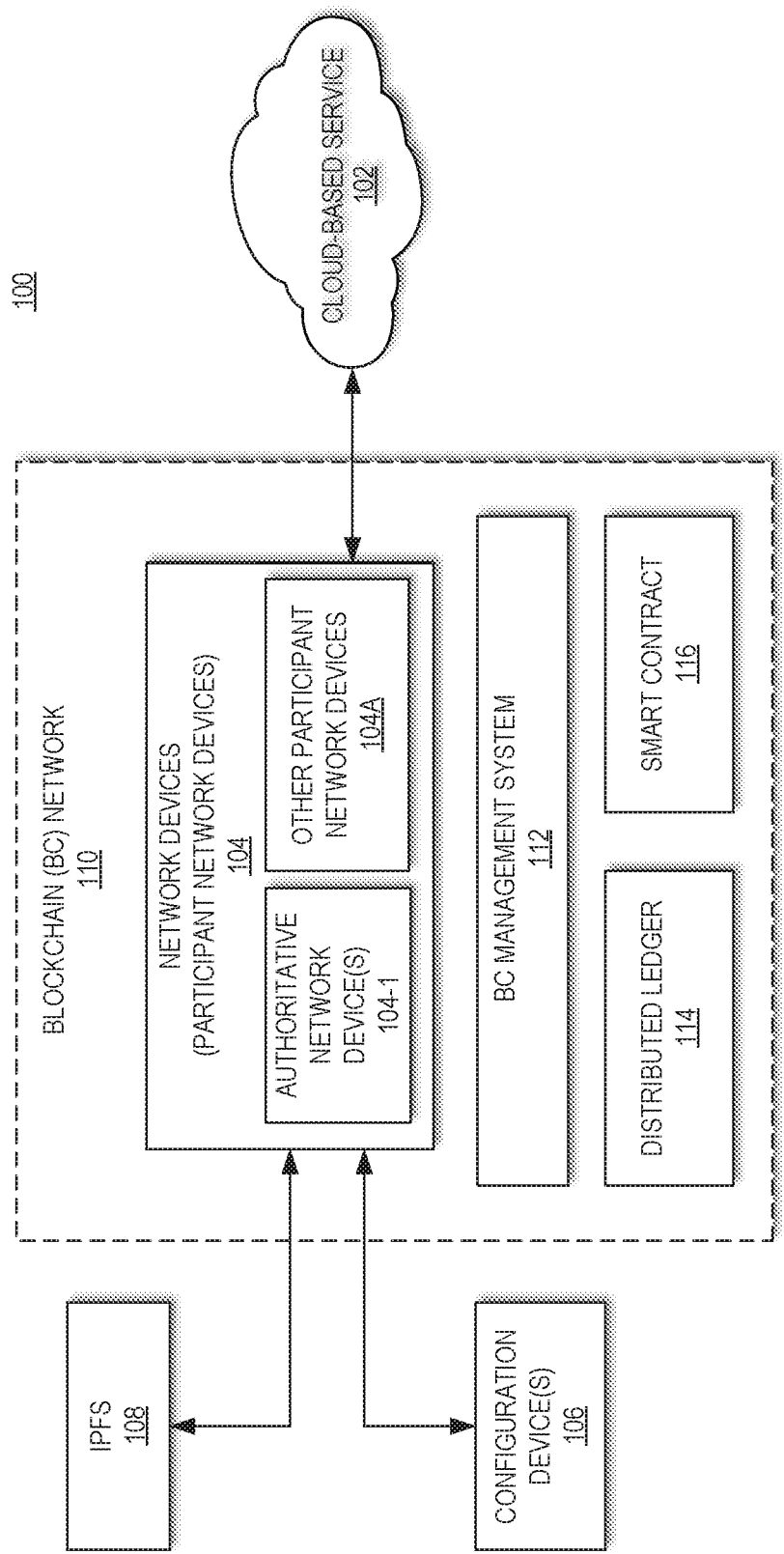
FIG. 1 is a block diagram of a network including a plurality of network devices, deployed in the network, for updating a public key certificate in the network devices using a BC network, in accordance with an example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "coupled," as used herein, is defined as connected or coupled, whether directly without any intervening elements or indirectly with at least one intervening element, unless otherwise indicated. Two elements can be coupled mechanically, electrically, or communicatively linked through a communication channel, pathway, network, or system. It will also be understood that, although the terms first, second, third, etc. may be used herein to describe various elements, these elements should not be limited by these terms, as these terms are only used to distinguish one element from another unless stated otherwise or the context indicates otherwise.

During the initial deployment of a network at a site such as office complexes, hospitals, airports and the like, hundreds or thousands of network devices (e.g., access points, switches, routers, etc.) need to be configured to perform desired functions. The configuration applies network identifiers, security settings, encryption type, power levels and other parameters to the network devices. In order to configure the network devices that are in a non-provisioned state, are often provisioned first and then configured. Provisioning generally involves providing provisioning information to a network device that is in a non-provisioned state. Provisioning information includes information about configuration settings, as prescribed by a particular customer, for configuring the network device. Once a network device obtains the provisioning information, the network device is configured with the configuration settings (e.g., network identifiers, encryption type, security settings, power levels, names, etc.), as prescribed by the customer. A network device is indented to operate after configuring it with the particular configuration settings. Even after initial deployment, some or all of the network devices may need to be re-configured to apply updated or changed configuration settings. Configuration and re-configuration also may occur when one or more new network devices are added to an already established network.

In a "non-provisioned state," a network device has no configuration settings and has no knowledge of a configuration device (e.g., network management server such as AirWave® or a controller such as ARUBA® 6000, 7200 or 3×000 controllers). In contrast, in a provisioned state, the network device is provided provisioning information that includes information about how the device may contact its configuration device to retrieve information, such as firmware and configuration settings and in what configuration group the network device belongs. Furthermore, the provisioning information may be used to automatically assign the network device to specific geographical locations.

Provisioning of the network devices may be performed manually or occur automatically. In some examples, provisioning of hundreds or thousands of network devices may be facilitated by a cloud-based service such as Aruba® Activate™, for example. The cloud-based service may facilitate zero-touch (automatic) provisioning of network devices. Zero-touch provisioning eliminates the need for technical support personnel to visit an installation site to provision a network device, avoids re-shipment of the network device after provisioning, and optimizes use of resources. In some examples, when a newly-ordered network device is added to the network, it is automatically added to a customer's inventory in the cloud-based service, and is provided with provisioning information for that customer.

Moreover, secure operation of a network generally involves validation of the network devices in the network when the network devices communicates with one another. Validation often includes soliciting certificates (e.g., public key certificates) from a trusted platform module (TPM) deployed within each network device. For example, when a new network device in a non-provisioned state is connected to the network, the new network device in the non-provisioned state establishes communication with the cloud-based service. During such communications, validation of the new network device is performed, which includes soliciting a public key certificate deployed within the network device. Upon validation, the network device retrieves its provisioning information from the cloud-based service and then uses that information to obtain its configuration settings information from a configuration device.

A certificate is an electronic document that identifies an entity such as a server, a device, a company, or some other entity. Public Key Infrastructure (PKI) is a system for governing and managing such certificates and their associated keys (e.g., public-private key pair). In particular, PKI is responsible for issuing, retaining, and revoking certificates over insecure networks. In this regard, PKI allows users to exchange data using public-private key pairs, obtained and exchanged in form of a digital certificate by a certificate authority (CA). A certificate authority is an entity that issues digital certificates to clients after verifying their legitimacy. A trusted certificate authority validates identities and issues trusted digital certificates. A certificate authority can be an independent third party or an organization that runs its own certificate-issuing server software. The methods used to validate an identity vary depending on the policies of a given certificate authority.

A digital certificate, as used herein, associates an identity (e.g., name) of an entity with a public key, and also referred to as a public key certificate. A public key certificate contains information about the key owner (i.e., an end-entity such as a customer), the public key, an expiration date, the signature of the certificate authority that issued it etc. In order to associate the identity to the public key, a chain of certificates (or a chain of trust) is established. Generally, the chain of certificates includes a list of certificates that includes an end-entity certificate, a root CA certificate and one or more intermediate certificates. A root CA certificate is issued by an originating or root certificate authority which is a publicly trusted certificate authority. The root certificate authority has the ability to sign intermediate certificate(s) issued by one or more intermediate certificate authorities trusted by the root certificate authority. Intermediate certificate(s) provide a flexible structure for conferring the validity of the root certificate authority to additional intermediate and end-entity certificates in the chain. The end-entity certificate is the final link in the chain of trust. The end-entity certificate (sometimes known as a leaf certificate or server certificate) serves to confer the root certificate authority's trust, via any intermediate certificate(s) in the chain, to an entity such as a website, company, government, or individual person. An end-entity certificate is issued to a specific domain as needed by a given end-entity. The validity of the root certificate authority is vital to the integrity of the chain as a whole. If the root certificate authority is publicly trusted (like SSL.com), the root CA certificates or intermediate certificates may be included by a software company in its browser and operating system software. This inclusion ensures that certificates in the chain of certificates leading back to a root CA certificate will be trusted by the software.

As discussed, public key certificates may be validated among the components such as network devices, cloud-based service and configuration devices in a network for proper functioning of the network devices during the operation. For example, in accordance to an industry standard process, a public key certificate included in a given network device is used to verify to the cloud-based service that the given network device is a trusted network device. A public key certificate (e.g., a root CA certificate, intermediate certificate, etc.) is embedded into the firmware of each of the network devices. The public key certificates embedded in the network devices are often updated (e.g., when expired) via a firmware update. If a given network device does not contain an active public key certificate or if it contains an active public key certificate that is not signed by a trusted certificate authority, the cloud-based service does not recognize the given network device as a trusted network device. In such instances, the communications, secured by such public key certificate, from or to the given network device to or from any other device in the network would not be allowed.

In some scenarios when a certificate authority is acquired by another entity, due to some reason, the public key certificate embedded in each of the network devices needs to be replaced with a new public key certificate issued for the other entity. Failing to replace the public key certificate in the network devices may cause errors in communicating with the cloud-based service and the configuration device(s). As a result, the network service may become unavailable.

Examples described herein address these technological problems by facilitating updating public key certificates to network devices, deployed in a network, using a blockchain (BC) network. In some examples, provisioning of a network device may also be facilitated by the BC network. The systems and methods as described herein use a BC network for communicating location information of a new public key certificate to the network devices. The use of BC network may enable communicating the location information to all the network devices at a time in a secure and verifiable manner. In some examples, the systems and methods may also facilitate provisioning a new network device (that is in a non-provisioned state) by providing a latest public key certificate and provisioning information, using the BC network, to the new network device.

In an aspect of the present disclosure, a method for updating a new public key certificate, using a BC network, to a plurality of network devices deployed in a network. The network devices of the plurality of network devices participate in the BC network. The method includes receiving, by a network device of the plurality of network devices, a transaction in a distributed ledger of the BC network. The transaction includes location information of a new public key certificate to be deployed in each of the network devices. The method further includes verifying, using a smart contract, whether the new public key certificate is valid and whether the new public key certificate is different from a previously recorded public key certificate in the distributed ledger. In response to successful verification by at least a predefined number of network devices of the plurality of network devices, the method includes recording, by each of the network devices, the transaction in the distributed ledger.

A "blockchain" may be a digital ledger for maintaining records of a sequence of executed transactions or events in blocks, which are linked cryptographically. A "block" may be a unit of data recordation for a blockchain. Each block may contain information indicating the corresponding transaction and a cryptographic hash of prior block, linking the two blocks. This way, blocks may be chained together by including the cryptographic hash of the prior block in the blockchain. Such chaining of blocks may confirm the integrity of a block and make it difficult to alter a block in the blockchain without such alteration being readily detectable. In some examples, a blockchain may be implemented in a BC network, which may comprise a plurality of nodes to implement the BC network. In such examples, the BC network may implement a blockchain as a distributed ledger, which is a form of a decentralized database that may be stored at one or more nodes participating in the BC network (e.g., participant nodes or blockchain nodes, such as respective computing devices). In such examples, each node participating in a BC network may get a copy of the blockchain (i.e. the distributed ledger), which may be downloaded automatically upon enrolling (e.g., registering as per a registration model to access the BC network) for the blockchain network. In these implementations, each participant node may need to enroll with the BC network according to an access policy (including a registration model to access the BC network) to use or access the distributed ledger. In some examples, the enrollment may be a part of an overall BC network for a node or an entity accessing the BC network.

A BC management system that includes at least some participant nodes (e.g., authoritative nodes) may maintain the distributed ledger and cryptographically validate each transaction generated in the distributed ledger and a new block added to the blockchain corresponding the transaction using consensus process. The BC management system includes logic or rules for performing various functionalities such as recording transactions, writing ledger entries, performing consensus process, in accordance with blockchain protocols and specifications. The BC management system may record information identifying the participant nodes, a transaction and information identifying an owner of each block. An owner of a block may be a participant node that provides data to create that block in the distributed ledger.

Further, a BC network may be implemented as a public blockchain network, a private blockchain network, or a hybrid blockchain network having a combination of both the public blockchain network and the private blockchain network. A public BC network is accessible to any entity and whereby any entity may participate in the public BC network. In a private BC network, the access to the BC network may be restricted for securing its privacy. In this implementation, a permissioned set of participant nodes can access the BC network depending on participant node's requirements, type of information to be shared etc. In such implementations, participant nodes of the BC network may be assigned with certain protocols and permissions to access the BC network. The private BC network may also be referred to as a permissioned BC network. In such implementation, some participant nodes may have only read permissions while other participant nodes may have read and write permissions. Further, some participant nodes may access data pertaining only to them via public-private key encryption. In this example, data on the distributed ledger may be relevant to a given participant node that may be encrypted using a blockchain public key such that only a blockchain private key can decrypt its contents. In some examples, a BC network may be a sidechain. A sidechain is a separate BC network that is attached to a main BC network. The main BC network includes a main blockchain and all additional blockchains are referred to as 'sidechains'. Sidechains allow tokens and other digital assets from main blockchain to be securely used in a separate blockchain and then be moved back to the main blockchain if needed. This way, a subset of a plurality of nodes can share data among themselves and share a subset of data to the main blockchain.

Examples are further described herein with reference to FIGS. 1-7. It should be noted that the description and figures merely illustrate the principles of the present subject matter along with examples described herein, and should not be construed as limiting the present subject matter. Furthermore, any functionality described herein as performed by a component (e.g., a network device or a BC management system) may be performed by at least one processor of the component executing instructions (stored on a machine-readable storage medium) to perform the functionalities described herein. Various implementations of the present subject matter have been described below by referring to several examples. Although the one or more portions of the description herein are with reference to network devices deployed in an organization, the methods and described techniques may be utilized for several organizations.

FIG. 1 depicts an example network 100 utilizing a cloud-based service 102 that is adapted for receiving communication from a plurality of network devices 104, individually, implemented in an organization. The organization may be a multiple-user organization such as a business, educational institution, government entity, or any other organization having multiple users and possibly multiple physical and geographical sites. A provider of the cloud-based service 102 may utilize the cloud-based service 102 to assist one or more organizations (i.e., one or more customers) in configuring and reconfiguring the network devices 104 and any new network device to be added to the network 100. Although FIG. 1 depicts the network devices 104 belonging to one organization, the network 100 may include many more network devices implemented in more than one organizations that is in communication with the cloud-based service 102.

The network 100 may be a private network such as a corporate network. A private network may be a network that includes security and access controls such that only certain users are authorized to access the private network. Authorized users may include, for example, one or more users of the organization. The network 100 may be wired or wireless. In examples described herein, the network 100 may include, but are not limited to, an Internet Protocol (IP) or non-IP based local area network (LAN), virtual LAN (VLAN), wireless local area network (WLAN), virtual private network (VPN), the Internet, or the like. Communication over network 100 may be performed in accordance with various communication protocols such as, but are not limited to, Transmission Control Protocol and Internet Protocol (TCP/IP), User Datagram Protocol (UDP), IEEE 802.11, and/or cellular communication protocols over communication links.

The network devices 104 may provide connectivity to various client devices (not shown in Figures) such as computing devices used by the users in the organization. A client device can access network resources, including other devices of the network and the network 100, via one of the network devices 104. Examples of the network devices 104 may include, but are not limited to, access points, switches, or routers.

One or more configuration devices 106 may be implemented in the organization to manage the operations in the network 100. The configuration device(s) 106 may be implemented in one or more of the geographical sites, and may be in communication with the network devices 104. The configuration device(s) 106 may be operable to manage and configure the network devices 104 implemented across all the geographical sites.

The cloud-based service 102 may be configured to receive device information (e.g., MAC address, serial number, or other information used to identify a network device) from manufacturers, vendors/resellers, customers or network administrators for subsequent deployment of that network device. The cloud-based service 102 may further be configured to provide provisioning information to the new network device in a non-provisioned state. In addition, the cloud-based service 102 manages any communication between any of the network devices 104 with their respective configuration device(s) 106. The cloud-based service 102 may further facilitate reconfiguration of any of the network devices 104.

In the examples described herein, the network 100 includes a BC network 110 including the network devices 104 for communicating location information of a public key certificate among network devices 104. Each of the network devices 104 participates in the BC network 110, and is referred to as a participant network device or a participant node. As such, each of the participant network device 104 can access the BC network 110. In some examples, the BC network 110 may also communicate provisioning information for a network device in a non-provisioned state.

In an example, the BC network 110 may be implemented as a private BC network where the network devices 104 deployed in an organization participate to the BC network 110. Although some examples are described herein with respect to the private BC network, it should be appreciated that the technology disclosed herein may be adapted for use in public or hybrid BC networks. Further, the BC network 110 may be a main BC network associated with the network devices 104 (i.e., a set of network devices 104 deployed in an organization) or a sidechain of a main BC network that may be associated with a plurality of sets of network devices deployed in different organizations.

Each of the participant network device 104 may have a role-based access to the BC network 110 according to the contract terms for accessing the BC network 110 and/or the rules that define the blockchain protocols and specifications. For example, one of the participant network devices 104 may have read and write access while another participant network device 104 may have read only access. In the examples described herein, one of the participant network devices 104 is designated as authoritative network device 104A that has access to write a transaction to the BC network 110. The authoritative network device 104A may be accessible to an administrator (e.g., a user in the organization) and may receive information such as information about a new network device, firmware updates and a public key certificate. In an example, the authoritative network device 104A has read and write access and other participant network devices 104B have read only access. Although FIG. 1 depicts one authoritative network device 104A, the BC network 110 may include more than one authoritative network devices.

In certain examples, the authoritative network device 104A is a network device that provides the cloud-based service 102. In these instances, the cloud-based service 102 participates in the BC network 110. Such implementation may be provided in a deployment where the cloud-based service 102 manages the network devices of a single organization. In some other examples, a network device that provide the cloud-based service 102 doesn't belong to the network devices 104. That is, the cloud-based service 102 may not participate in the BC network 110.

As illustrated in FIG. 1, the BC network 110 further includes a BC management system 112, a distributed ledger 114 and a smart contract 116. The BC management system 112 maintains the BC network 110. In some examples, the BC management system 112 may perform the functionalities of BC network 110 according to various blockchain protocols and specifications and the contract terms included in the smart contract 116. The BC management system 112 may perform several functions to record, share and retrieve information to and from the distributed ledger 114. As will be appreciated, the operations performed by the BC management system 112 may be performed on one or more of participant network devices 104. Most of the functionalities described as performed by BC network 110 may be performed by instructions stored on at least one machine-readable storage medium of the participant network device(s) 104, executed by at least one processor of the participant network devices(s) 104. The at least one machine-readable storage medium may be non-transitory machine readable medium. The at least one machine-readable storage medium may be implemented by volatile memory (e.g., one or more volatile memory devices, such as DRAM device(s), DIMM(s), or the like).

The distributed ledger 114 may be composed of ledger blocks that each refer back to a hash of a prior ledger block. A block is generated corresponding to each step occurred or performed during occurrence of a transaction. The generated block includes information about the transaction, the participant network device 104 (e.g., the authoritative network device 104A) generated the transaction and time stamp of the recordation of the transaction. The information recorded in the block may be unencrypted, encrypted, or hashed. In some examples, the information recorded in a block may be encrypted or hashed, and a particular participant network device of the network devices 104 can decrypt the information.

A transaction may refer to any activity, operation or event, related to registering a network device with the BC network 110, information about a public key certificate (e.g., a new public key certificate), retrieval of the information related to the public key certificate, receipt of the public key certificate, a request raised by a new network device to get the latest public key certificate, or the like. Other examples may include a request by the new network device to get provisioning information, retrieval of information about the provisioning information by the new network device or receipt of the provisioning information etc. A transaction may also include a query raised by any network device 104 to find certain information related to a public key certificate or provisioning information. In an example, a transaction occurred or performed in relation to a public key certificate or provisioning information may be according to a verified transaction (that may be allowed to be recorded) as per the smart contract 116.

The smart contract 116 may be a processor executable code residing in the BC network 110 for the execution of functionalities such as registering a network device with the BC network 110, transactions to be recorded in the distributed ledger 114 etc. based various blockchain protocols and specifications and the contract terms. In an example, the smart contract 116 may include contract terms for accessing the BC network 110 such as a registration model for accessing the BC network 110. In some examples, the BC network 110 may permit or restrict a new network device to access the BC network 110 according to the contract terms and/or the rules that define the blockchain protocols and specifications. Further, the smart contract 116 may include contract terms for validating a transaction to be recorded in the distributed ledger 114.

The BC management system 112 may include logic or rules for automatically executing the contract terms of the smart contract 116. In an example, each participant network device 104 may include logic or rules for automatically executing contract terms of the smart contract 116. For example, each participant network device 104 includes logic or rules for interacting with other participant network devices, reading or writing transactions, reading or writing ledger entries, participating in consensus process, and/or performing other blockchain related functions according to various blockchain protocols and specifications and the contract terms.

In an example, a transaction may be recorded in the distributed ledger 114 once consensus is reached based on the consensus process in accordance with the rules or logic agreed by the participant network devices 104. For example, the logic may dictate that a transaction would be recorded in the distributed ledger 114 when all the participant network devices 104 provide their consent. In such examples, even if one of the participant network devices 104 does not provide its consent, the transaction would not be recorded. In another example, the logic may dictate that a transaction would be recorded in the distributed ledger 114 when majority (e.g., more than 50 percent) of participant network devices 104 provide their consent. In such examples, the transaction would be recorded if majority of participant network devices 104 provide their consent and the participant network devices 104 that have not provided their consent would have to record the transaction. Once the consensus is reached, the transaction may be recorded on the distributed ledger 114 of the BC network 110. Each participant network device 104 store a copy of the distributed ledger 114.

The network 100 may also include an Inter Planetary File System (IPFS) 108 in conjunction with the BC network 110. IPFS is a protocol and peer-to-peer network for storing and sharing data in a distributed file system. IPFS uses content-addressing, according to which the data stored on IPFS is linked with the cryptographic hash (i.e., IPFS hash or IPFS link) of its content. When data is stored on the IPFS, it can be retrieved by its content address (i.e., IPFS link). In an example, each participant network device 104 is coupled to the IPFS 108 and can access the IPFS 108. In the examples as described herein, the location information of the new public key certificate includes the content address (i.e., IPFS link) of the new public key certificate on the IPFS 108.

In an example, the BC network 110 may be set up by the authoritative network device 104A. When the BC network 110 is set up, the BC management system 112 may receive and store device information of the authoritative network device 104A. The authoritative network device 104A may be the one that provides the cloud-based service 102 or received the information from the cloud-based service 102. In an examples, the authoritative network device 104A may record a public key certificate already deployed (i.e., previously deployed) in the TPM of the authoritative network device 104A or previously deployed within each network device 104 in the network 100. In an example, the authoritative network device 104A stores the previously deployed public key certificate to the IPFS 108, obtains an IPFS link corresponding to the public key certificate from the IPFS and records the location information (i.e., the IPFS link) related to the previously deployed public key certificate in the distributed ledger 114. In an example, a block is generated in the distributed ledger 114 corresponding to the transaction of recording the location information of the previously deployed public key certificate. That is, the previously deployed public key certificate in the network devices 104 may be recorded in the distributed ledger 114. The block may include information including details of the transaction such as IPFS link corresponding to the public key certificate and owner of the block (i.e., information about the authoritative network device 104A that generated the block in the distributed ledger 114).

When a network device (e.g., one of the network devices 104B) already deployed in the network 100 or a new network device to be deployed in the network 100 accesses the BC network 110, the BC management system 112 may verify network device using the contract terms for accessing the BC network 110. In an example, the BC management system 112 may receive device information from that network device and determine whether the received device information is included in the customer's inventory of the cloud-based service 102. In an example, the authoritative network device 104A determines the device information from the cloud-based service 102 and verifies the network device. In some examples, the authoritative network device 104A may receive device information from the manufacturer, vendor/reseller, customer or network administrator and verifies the network device for registering the network device. After the verification, the BC management system 112 may enroll (or register) the network device and generate a block in the distributed ledger 114 corresponding to the transaction of registering the network device. The block in the distributed ledger 114 may include information including details of the transaction such as enrollment/registration of the network device, its device information, etc. Further, any new network device that is deployed in the network 100 can be registered with the BC network 110 as an authoritative network device as per contact terms and/or the rules that define the blockchain protocols and specifications. The new network device may have the role of an authoritative node in the BC network 110 and may have access to read and write a transaction to the BC network 110.

In the examples as described herein, the authoritative network device 104A may receive a new public key certificate from an administrator to be included in the TPM deployed within each network device 104 that is deployed or to be deployed in the network 100. In an examples, the new public key certificate may be a root CA certificate or an intermediate certificate. The administrator may receive the new public key certificate issued from an issuing certification authority and provides that to the authoritative network device 104A. An issuing certificate authority may be a root certificate authority or an intermediate certificate authority that issues a particular public key certificate. The new public key certificate may have been issued in response to expiration, revocation or a change of an issuing certificate authority of the previously deployed public key certificate in the network devices 104.

A public key certificate generally binds a particular public key to an identity, of the entity, that the public key certificate identifies, such as the name of a server. The public key certificate helps in preventing the use of fake public keys for impersonation. Only the public key certified by the public key certificate works with the corresponding private key possessed by the entity that is identified by the public key certificate. In addition to the public key, the public key certificate includes the name of the entity (e.g., a company) it identifies, an expiration date, the name of the issuing certification authority that issued the certificate, a serial number, a common name (CN), key usage that identifies a purpose or reason for the certificate and other information. Common name (CN), also known as Fully Qualified Domain name (FQDN) is the characteristic value within a distinguished name. CN is often composed of a host domain name (e.g., host name of a server). An example CN may be activate.arubanetworks.com. Further, the public key certificate always includes the digital signature of the issuing certificate authority. The digital signature of the issuing certificate authority allows the certificate to function as an introduction for an entity who knows and trusts the issuing certificate authority or the root certificate authority and don't know another entity identified by the public key certificate.

Figure 2:
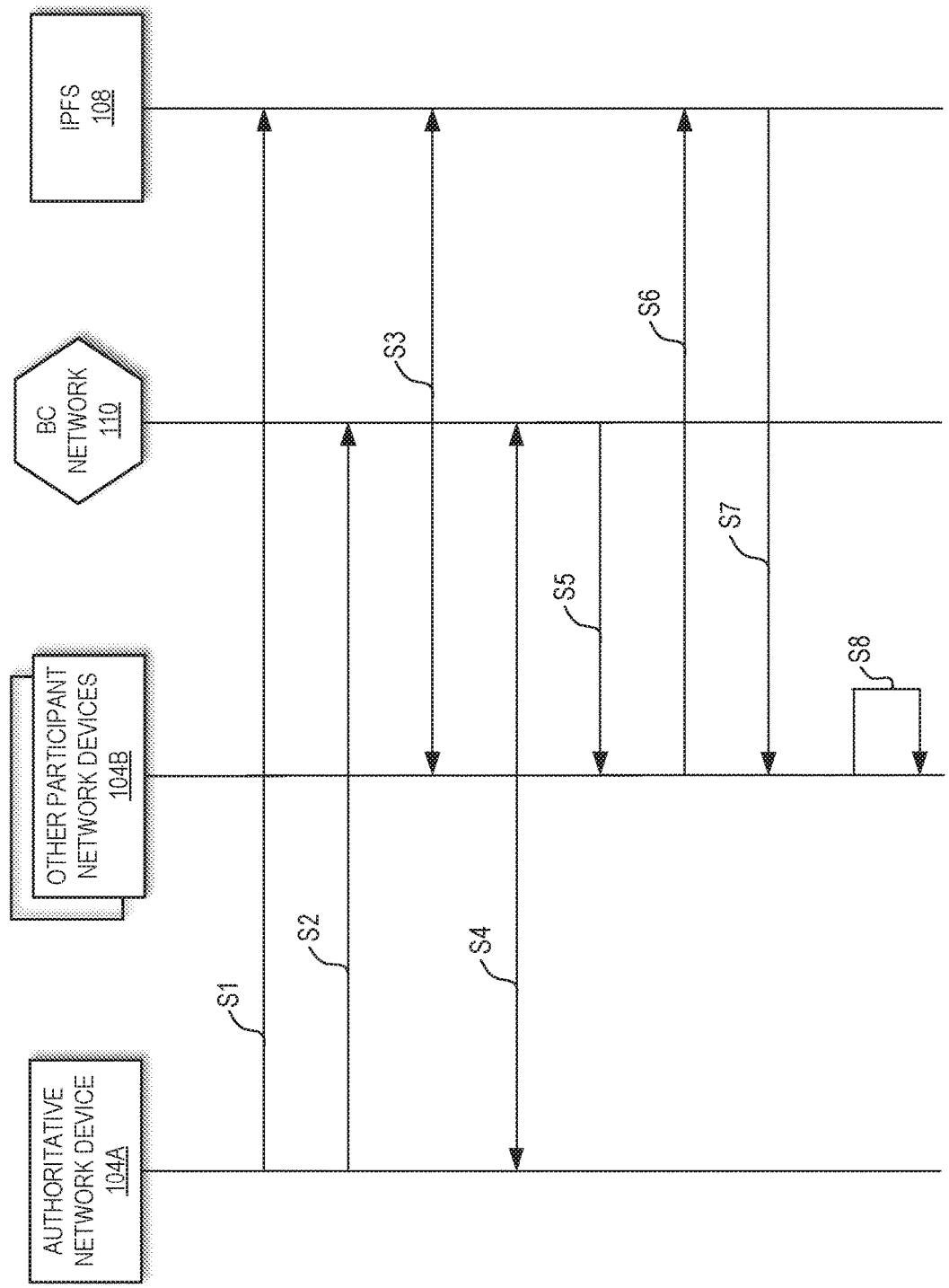
FIG. 2 is a sequence diagram showing an example process for updating a public key certificate, using a BC network, in each network device of a plurality of network devices deployed in a network.

FIG. 2 is sequence diagram showing a process of updating the new public key certificate among network devices 104 of the network 100 of FIG. 1, via the BC network 110, in an example. In S1, the authoritative network device 104, that received the new public key certificate, stores the new public key certificate on the IPFS 108. On storing the new public key certificate on the IPFS 108, the authoritative network device 104A obtains an IPFS link from the IPFS 108 corresponding to the new public key certificate. In an example, the IPFS link includes an address of the new public key certificate in the IPFS 108.

Next in S2, the authoritative network device 104A provide location information of the new public key certificate, to the BC management system 112 of the BC network 110, to generate a transaction in the distributed ledger 114 of the BC network 110. In an example, the authoritative network device 104A generates the transaction including the location information of the new public key certificate. The location information may be the IPFS link corresponding to the new public key certificate stored in the IPFS 108.

In S3, when the BC management system 112 receives the transaction, the BC management system 112 may validate the transaction using the smart contract 116 as per the logic agreed by the participant network devices 104. At least a number of network devices 104B (except the authoritative network device 104A) of the participant network devices 104 may participate in the consensus process to validate the transaction using the smart contract 116. In an example, each participant network device 104B (except the authoritative network device 104A) participate in the consensus process. A number of participant network devices out of the participant network devices 104B or all the participant network devices 104B that participate in the consensus process may be referred to as designated network devices.

In an example, the smart contract 116 may include codes to verify whether the new public key certificate is valid and whether the new public key certificate is different from a previously recorded public key certificate in the distributed ledger 114. In an example, the previously recorded public key certificate in the distributed ledger 114 may be any public key certificate whose location information is recorded in the distributed ledger 114 prior to recording the location information of the new public key certificate. In an example, the previously recorded public key certificate may be the previously deployed public key certificate in the network devices 104. In order to verify whether the certificate is valid, the smart contact 116 includes codes to verify whether (i) the new public key certificate has a valid expiry date, (ii) the new public key certificate has not been revoked and (iii) a CN of the new public key certificate matches a CN of the previously deployed public key certificate. In some examples, the smart contract 116 may further includes codes to verify one or more features such as a basic constraint or a key usage of the new public key certificate. The basic constraint identifies the chain of certificates and the key usage identifies a particular reason or purpose of that public key certificate. In some examples, the smart contact 116 further includes codes to verify whether a source that has generated the transaction including the location information of the new public key certificate is a valid source.

In an example, each designated network device 104B can retrieve the new public key certificate from the IPFS 108 using the IPFS link included in the transaction and execute the smart contract 116 to verify whether the new public key certificate is valid and whether the new public key certificate is different from a previously recorded public key certificate in the distributed ledger 114.

In order to verify whether the new public key certificate has the valid expiry date, each designated network devices 104B may determine whether the expiry date of the new public key certificate is a date in future (e.g., a date after 1 year, 5 years or 10 years). An expiry date of a public key certificate is the date after which it expires (i.e., after expiry date, the certificate is no longer valid). In an example, each designated network device 104B checks the expiry date of the new public key certificate to determine whether the new public key certificate has the valid expiry date. In instances when a designated network device of the network devices 104B determines that the new public key certificate does not have the valid expiry date, that designated network device does not verify the transaction and hence does not provide its consent.

In order to verify whether the new public key certificate has not been revoked, each designated network device 104B may retrieve Uniform Resource Locator (URL) for a certificate revocation list (CRL) included in the new public key certificate and check the CRL using the URL to determine whether the new public key certificate has been included in the CRL or not. In instances when the CRL does not include the new public key certificate, it is been determined that the new public key certificate has not been revoked. In instances when the CRL includes the new public key certificate, it is been determined that the new public key certificate has been revoked. In instances when a designated network device of the network devices 104B determines that the new public key certificate has been revoked, that designated network device does not verify the transaction and hence does not provide its consent.

Further, each designated network device 104B may determine the CN of the new public kay certificate, determine the CN of the previously deployed public key certificate (that may be recorded in the distributed ledger 114) and compare the two CNs. In some instances, the CN of the new public kay certificate matches that of the previously deployed public key certificate. In other instances, the CN of the new public kay certificate does not match that of the previously deployed public key certificate. In examples when a designated network device of the network devices 104B determines that the CN of the new public key certificate does not match that of the previously deployed public key certificate, that designated network device does not verify the transaction and hence does not provide its consent.

In some examples, each designated network device 104B may also check the basic constraint to determine whether the chain of certificates includes a predefined number of intermediate certificates. In some examples when a designated network device of the network devices 104B determines that chain of certificates includes a number of intermediate certificates more than the predefined number of intermediate certificates, that designated network device does not verify the transaction and hence does not provide its consent. In some examples, each designated network device 104B may also check the key usage to determine whether the new public key certificate will be used for the particular reason or purpose as identified by the key usage of the new public key certificate. In some examples when a designated network device of the network devices 104B determines that the new public key certificate will not be used for the particular reason or purpose as identified by the key usage, that designated network device does not verify the transaction and hence does not provide its consent.

In order to verify whether the new public key certificate is different from a previously recorded public key certificate, each of the designated network devices 104B compares the new public key certificate with the previously recorded public key certificate. In an example, each of the designated network devices 104B compares one or more features such as the expiry date, the issuing certificate authority etc. In some examples when a designated network device of the designated network devices 104B determines that the new public key certificate is not different from the previously recorded public key certificate, that designated network device does not verify the transaction and hence does not provide its consent. This way, the BC management system 112 ensures that the location information of the new public key certificate is recorded once in the distributed ledger 114 and does not duplicate the recordation.

In some examples, each of the designated network devices 104B verifies whether the source that has generated the transaction is a valid source. In this context, a valid source is a participant network device (i.e., the authoritative network device 104A) that can generate a transaction in the BC network 110 to be recorded, as per the rules and specification of the BC network 110. In order to verify whether the source that has generated the transaction is a valid source, each of the designated network devices 104B determines the device information of the participant network device that has generated the transaction and determines if the device information belongs to the authoritative network device. In some examples when a designated network device of the designated network devices determines that the source is not the authoritative network device 104A, that designated network device determines that the source is not the valid source. In such examples, the designated network device does not verify the transaction and hence does not provide its consent.

In some examples, when a designated network device verifies that the new public key certificate has the valid expiry date, has not been revoked, the CN of the new public key certificate matches that of the previously deployed public key certificate, and any additional feature such that the basic constraint and key usage, that designated network device verifies that the new public key certificate is valid.

Further, in some examples, when a designated network device verifies that the new public key certificate is valid and the new public key certificate is different from the previously recorded public key certificate in the distributed ledger 114, the designated network device verifies the transaction and provides its consent. In some examples, when a designated network device verifies that the new public key certificate is valid, the new public key certificate is different from the previously recorded public key certificate, and the source that has generated the transaction is a valid source, the designated network device verifies the transaction and provides its consent. In some other examples, when a designated network device does not verify that the new public key certificate is valid, the new public key certificate is different from the previously recorded public key certificate, or both, the designated network device does not verify the transaction and does not provide its consent. In some examples, when a designated network device does not verify that the source that generated the transaction is the valid source, the designated network device does not verify the transaction and does not provide its consent.

In some examples, at least a predefined number of designated network devices out of the designated network devices 104B may verify the transaction and provide their consent. The predefined number of designated network devices may be the majority (e.g., more than 50 percent) of a total number of designated network devices 104B. Depending on the logic (previously described) for consensus process, the BC management system 112 may determine whether the consensus is reached. In some examples, when all the designated network devices 104B verify the transaction and provide their consent, the verification of the transaction is successful and the consensus is reached. In some examples, if one of the designated network device 104B does not verify the transaction and does not provide its consent, the verification of the transaction is not successful and the consensus is not reached. In some examples, when at least predefined number of designated network devices 104B verifies the transaction and provides their consent, the verification of the transaction is successful and the consensus is reached. In some other examples, if a number of designated network devices that verify the transaction and provide their consent is less than the predefined number of designated network devices, the verification of the transaction is not successful and the consensus is not reached.

In response to successful verification, the consensus is reached. Once the consensus is reached, in S4, the BC management system 112 may record the transaction in the distributed ledger 114. In an example, each participant network device 104 records the transaction in its copy of the distributed ledger 114.

Next in S5, each participant network device 104 retrieves location information (i.e., the IPFS link) from the recorded transaction in the distributed ledger 114. In S6, each participant network device 104 accesses the IPFS 108. In S7, each participant network device 104 obtains the new public key certificate from the IPFS 108 using the IPFS link. In S8, each participant network device 104 stores the new public key certificate in its TPM.

In some examples, when a new network device is deployed in the network 100, the new network device automatically accesses the BC network 110. The BC management system 112 verifies the new network device as per the contract terms for accessing the BC network 110 as described above. After verification, the new network device is registered with the BC network 110. Once the new network device is registered with the BC network 110, the new network device is a participant of the BC network 110. In some examples, the new network device may be registered as an authoritative network device.

In the examples as described herein, the new network device is in a non-provisioned state. In order to operate, the new network device needs to obtain provisioning information to be provisioned. Provisioning information includes information of a configuration device, the information is subsequently used to establish communications with the configuration device to obtain configuration setting information for a network device. The configuration setting information may be used for configuring the network device.

The new network device, when deployed, may or may not include a public key certificate. In examples when the new network device does not include the public key certificate, the new network device requests the BC management system 112 to obtain the latest public key certificate. As used herein, requesting to the BC management system 112 may mean requesting in the distributed ledger 114 by querying the distributed ledger 114. In an examples, the latest public key certificate may include a public key certificate recorded at a latest time stamp in the distributed ledger 114. In response to the request to obtain the latest public key certificate, the BC management system 112 may provide location information of the latest public key certificate. In an example, the BC management system 112 provides the block in the distributed ledger 114 that contains the location information of the latest public key certificate. The new network device retrieves the location information from the distributed ledger 114, and then obtains the latest public key certificate using the location information. In certain examples, the new network device retrieves the IPFS link corresponding to the latest public key certificate from the distributed ledger 114, accesses the IPFS 108 and obtains the latest public key certificate using the IPFS link. The new network device then stores the latest public key certificate in its TPM. Once the new network device stores the latest public key certificate, it may be in a provisioned state and ready to communicate with the configuration device(s) 106.

In examples when the new network device includes a public key certificate, the new network device may determine whether the public key certificate is the latest public key certificate. The new network device may retrieve the latest public key certificate, recorded in the distributed ledger 114, using the BC network 110 as described above and compare its public key certificate and the latest public key certificate. In examples when the public key certificate included in the new network device and the latest public key certificate obtained using the BC network 110 are the same, the new network device does not retrieve the latest public key certificate. In some examples, the public key certificate included in the new network device and the latest public key certificate obtained using the BC network 110 are different. In such examples, the new network device retrieves the latest public key certificate using the BC network 110 as described above.

In some examples, the new network device is registered as an authoritative network device. In such examples, if the public key certificate included in the new network device is the latest public certificate and that latest public key certificate is not recorded in the distributed ledger 114, the new network device may generate a transaction to record the location information of its public key certificate.

The new network device then requests the BC management system 112 to obtain provisioning information. In an example, the provisioning information for the new network device includes information about one of the configuration device(s) 106. In an example, the authoritative network device 104A, which provides the cloud-based service 102, records the provisioning information for the new network device to the distributed ledger 114 in response to the request. In some examples, the authoritative network device 104A receives the provisioning information from the cloud-based service 102 and records the provisioning information to the distributed ledger 114. The new network device may then retrieve the provisioning information from the distributed ledger 114.

In some examples, the BC management system 112 may determine the provisioning information for the new network device. The network 100 may or may not include the cloud-based service 102. In such examples, the smart contract 116 may include codes for determining provisioning information for a network device. In certain examples, the smart contract 116 may include codes for determining the provisioning information based on one or more load-balancing features. Such provisioning information helps in balancing load on the configuration device(s) 106 in the network 100. The load-balancing feature(s) may include a location of the new network device, device information of the new network device, load characteristics of the configuration device(s) 106 such as information regarding available features and resources on the configuration device(s) 106, usage and location of each configuration device 106 or the like. The authoritative network device 104A may provide the load-balancing feature(s) to the BC management system 112. The BC management system 112 executes the smart contract 116 to determine the provisioning information for the new network device based on the load-balancing feature(s). Once the BC management system 112 determines and records the provisioning information for the new network device in the distributed ledger 114, the new network device receives the provisioning information from the distributed ledger 114. The new network device may then retrieve the configuration setting information from the configuration device as per the provisioning information. Upon receiving the configuration setting information from the configuration device, the new network device may get configured using the configuration setting information and attains the provisioned state. The new network device may then be ready to function in the network 100. In the examples described herein, the network devices 104 continue operating and performing various functionalities in the network 100 even if the cloud-based service 102 is not functioning.

Figure 3:
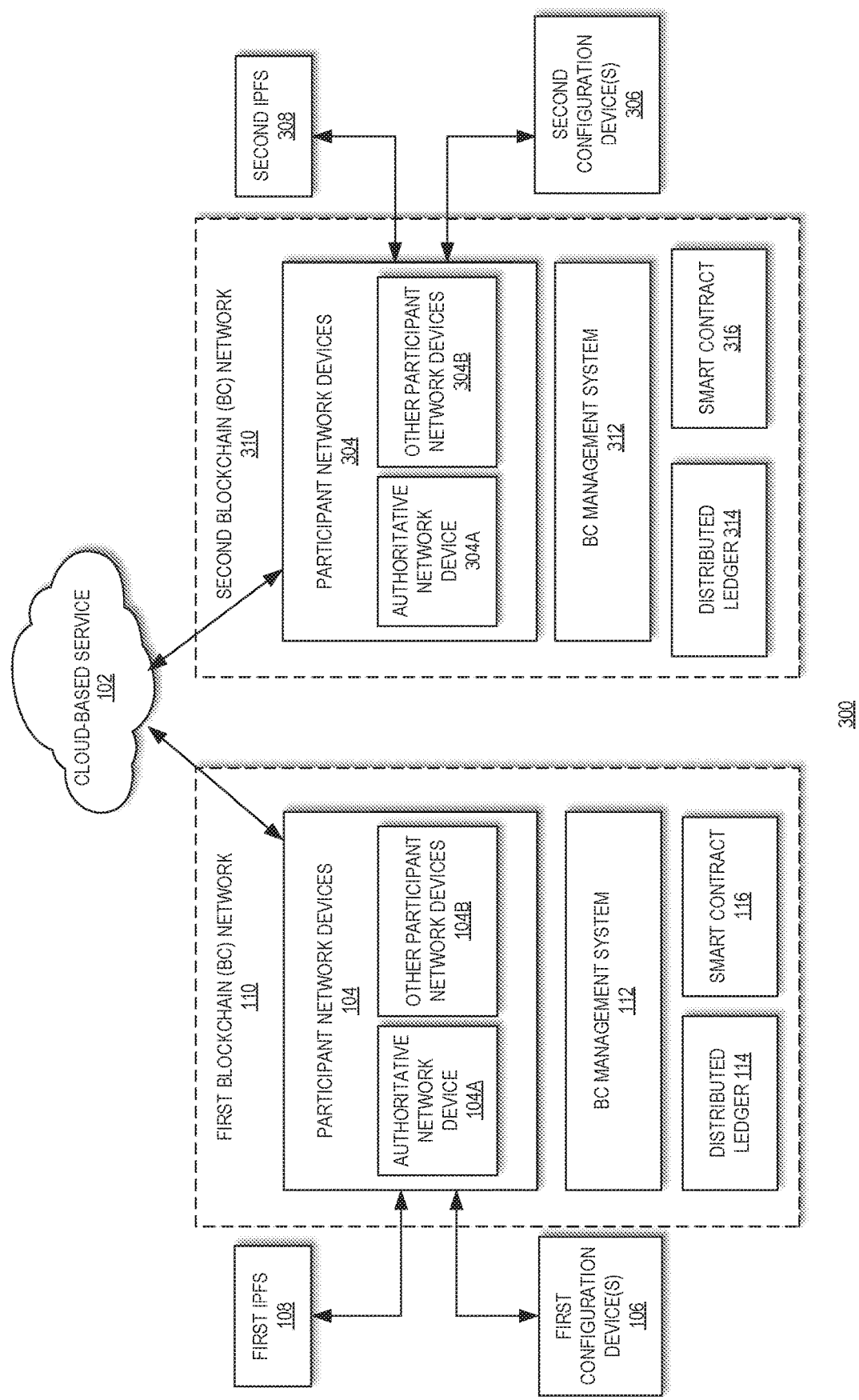
FIG. 3 is a block diagram of a network including a plurality of sets of network devices, deployed in the network, for updating a public key certificate in the network devices, using a BC network, individually, in each set of network devices, in accordance with an example.

FIG. 3 illustrates a network 300 in accordance with another example. Network 300 may include certain elements similar to those described in FIG. 1 which are marked with similar reference numerals, description of which are not repeated herein. In comparison to FIG. 1, the network 300 of FIG. 3 is shown to include two BC networks. As depicted in FIG. 3, the network 300 may include the BC network 110, that is a first BC network and a second BC network 310 associated with the cloud-based service 102. The first BC network 110 includes a set of the participant network devices 104 deployed in an organization and the second BC network 310 includes another set of participant network devices 304 deployed in another organization. The cloud-based service 102 may assist the two organizations in provisioning and reconfiguring the respective network devices 104 and 304. The first and second BC networks 110 and 310 may be separate BC networks or side chains of a main BC network. In such examples, the cloud-based service 102 may not participate in any of the first BC networks 110 or the second BC network 310. Similar to the first BC network 110, the second BC network may facilitate communicating location information of a public key certificate to the network devices 304. In addition, the second BC network may also facilitate communicating provisioning information to a network device that is in a non-provisional state and participate in the second BC network 310.

In a similar fashion as described in FIG. 1, the second BC network 310 includes a BC management system 312 analogous to the BC management system 112 of the first BC network 110. The participant network devices 304 may include an authoritative network device 304A and other participant network devices 304B, respectively, analogous to the authoritative network device 104A and other participant network devices 104B. The second BC network 310 may further includes a distributed ledger 314 analogous to the distributed ledger 114 and a smart contract 316 analogous to the smart contract 116 of the first BC network 110. The network 300 may further include one or more second configuration devices 306, analogous to the first configuration device(s) 106, that may be operable to manage and configure the network devices 304. The network 300 may further include a second IPFS 308, analogous to the IPFS 108, associated with the network devices 304. Each network device 304 may access the IPFS 308. As described with respect to the BC network 110 in FIG. 1, the authoritative network device 304A may receive a new public key certificate to be deployed in TPM of the network devices 304, store the new public key certificate to the second IPFS 308 and obtain an IPFS link corresponding to the new public key certificate, and provide location information (i.e., IPFS link) of the new public key certificate to the BC management system 312 to be recorded in the distributed ledger 314.

Figure 4:
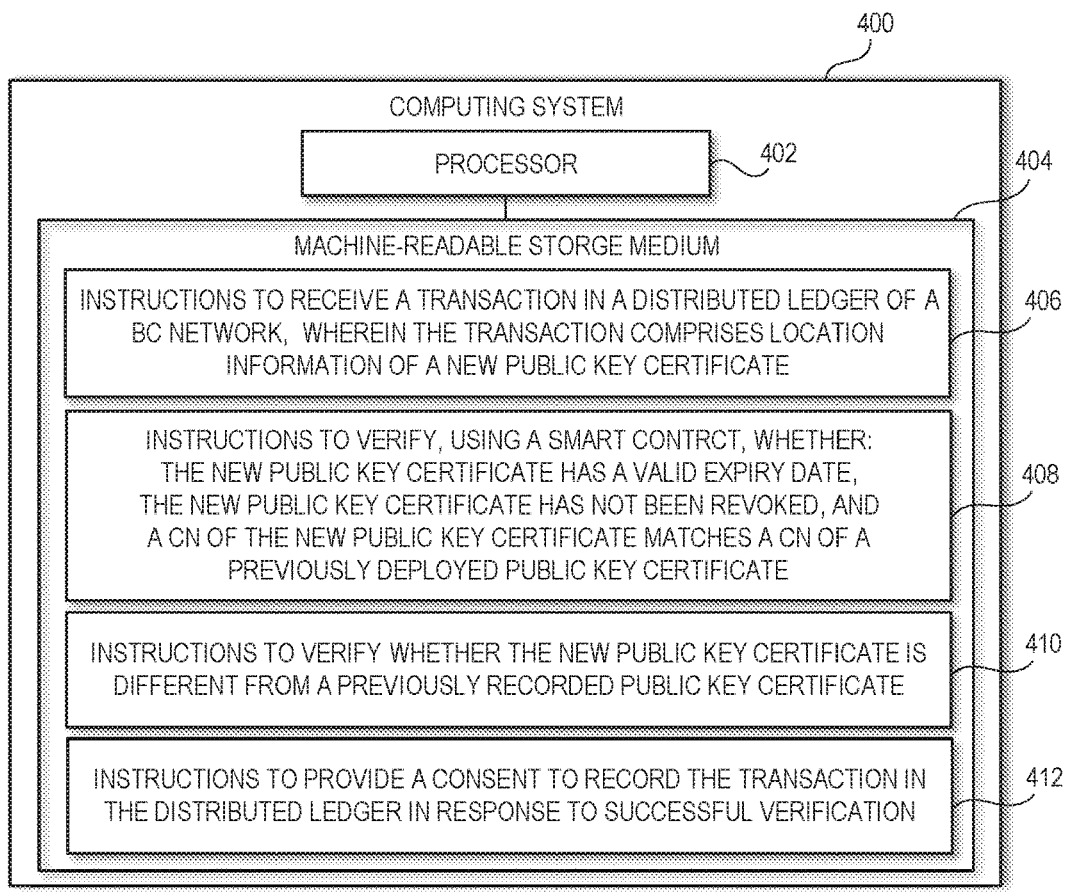
FIG. 4 is an example computing system including a processor and a machine-readable medium encoded with example instructions to update a public key certificate, using a BC network, in each network device of a plurality of network devices deployed in a network.

FIG. 4 is a block diagram of an example computing system 400 including a processor 402 and a machine-readable storage medium 404. The machine-readable medium 404 may be non-transitory machine readable medium including (e.g., encoded with) at least instructions 406, 408, 410 and 412 executable by the processor 402 to implement all or some of the functionalities described herein in relation to instructions 406-412. The instructions 406-412 of FIG. 4, when executed by the processor 402, may implement some or all functions of a BC management system (e.g., the BC management system 112 of FIG. 1) of a BC network (e.g., the BC network 110 of FIG. 1). In some examples, the computing system 400 may be included in (e.g., as part of) each participant network device 104 of FIG. 1.

For ease of illustration, FIG. 4 is described with reference to FIGS. 1 and 2. In certain examples, the instructions 406-412 may be executed for performing the functionalities of the BC management system 112 or one or more methods, such as, the methods 500, 600 and 700 described in FIGS. 5-7. In certain examples, as an alternative or in addition to executing the instructions 406-412, the processor 402 may include at least one integrated circuit, other control logic, other electronic circuitry, or combinations thereof that include a number of electronic components for performing the functionalities described herein as being performed by the BC management system 112.

Instructions 406, when executed, may cause the processor 402 to receive a transaction in the distributed ledger 112. The transaction includes location information of a new public key certificate.

Instructions 408, when executed, may cause processor 402 to verify, using the smart contract 116, whether the new public key certificate has a valid expiry date, the new public key certificate has not been revoked, and a CN of the new public key certificate matches a CN of a previously deployed public key certificate in the network devices 104. In some examples, a basic constraint and a key usage of the new public key certificate may also be verified as described above.

Instructions 410, when executed may cause the processor 402 to execute the smart contract 116 to verify whether the new public key certificate is different from the previously recorded public key certificate in the distributed ledger 114.

In some examples, when it has been determined that the new public key certificate has the valid expiry date, the new public key certificate has not been revoked, the CN of the new public key certificate matches the CN of the previously deployed public key certificate, and the new public key certificate is different from the previously recorded public key certificate in the distributed ledger 114, the verification of the new public key certificate is successful.

Instructions 412, when executed may cause the processor 402 to provide a consent to record the transaction in the distributed ledger 114 in response to the successful verification.

In some examples, the transaction may be verified by at least a predefined number of network devices as defined in the logic for consensus process as per blockchain protocols and specifications. Once consensus is reached, the transaction may be recorded in each copy of the distributed ledger 114 by each participant network device 104.

The instructions 406-412 may include various instructions to execute at least a part of the methods described in FIGS. 5-7 (described later). Although not shown in FIG. 4, machine-readable storage medium 404 may also include additional program instructions to perform various other method blocks described in FIGS. 5-7.

Figure 5:
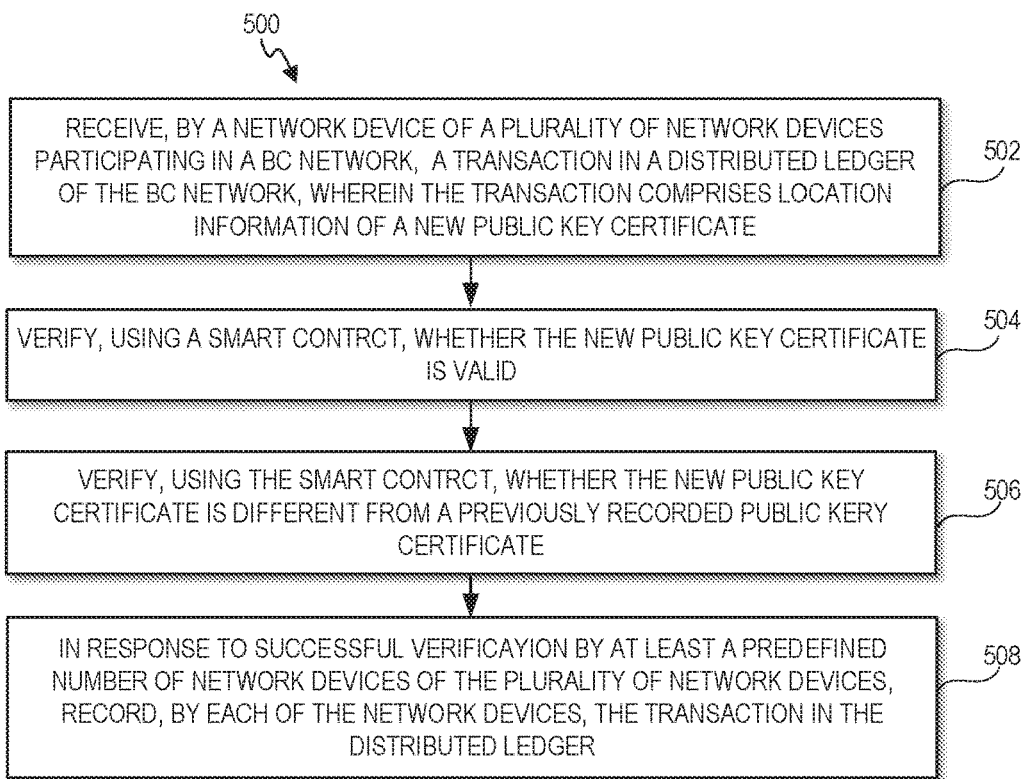
FIG. 5 is a flow chart illustrating a method for updating a public key certificate, using a BC network, in each network device of a plurality of network devices deployed in a network, in accordance with an example.
Figure 6A:
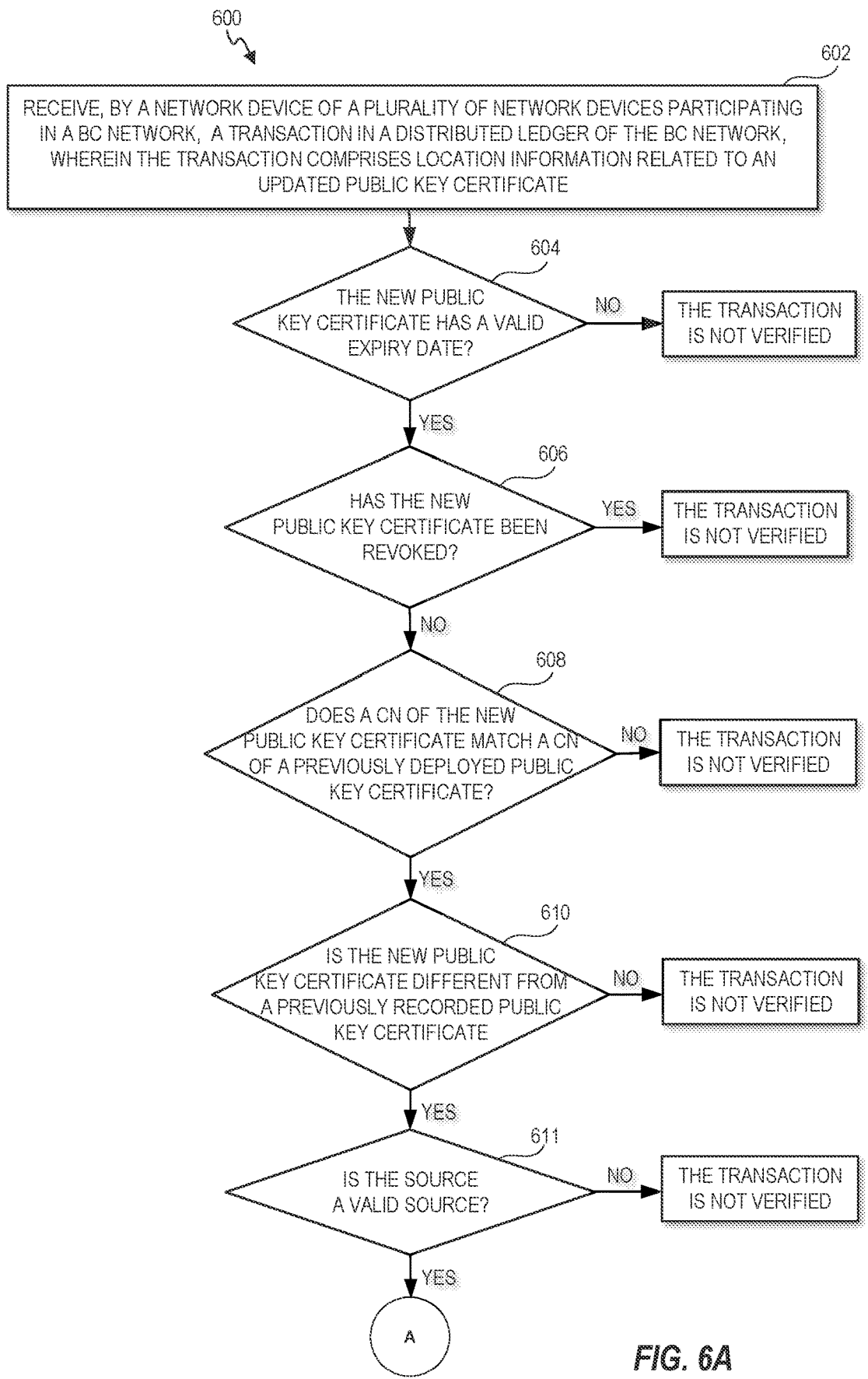
FIG. 6A is a flow chart illustrating a method for updating a public key certificate, using a BC network, in each network device of a plurality of network devices deployed in a network, in accordance with another example.
Figure 6B:
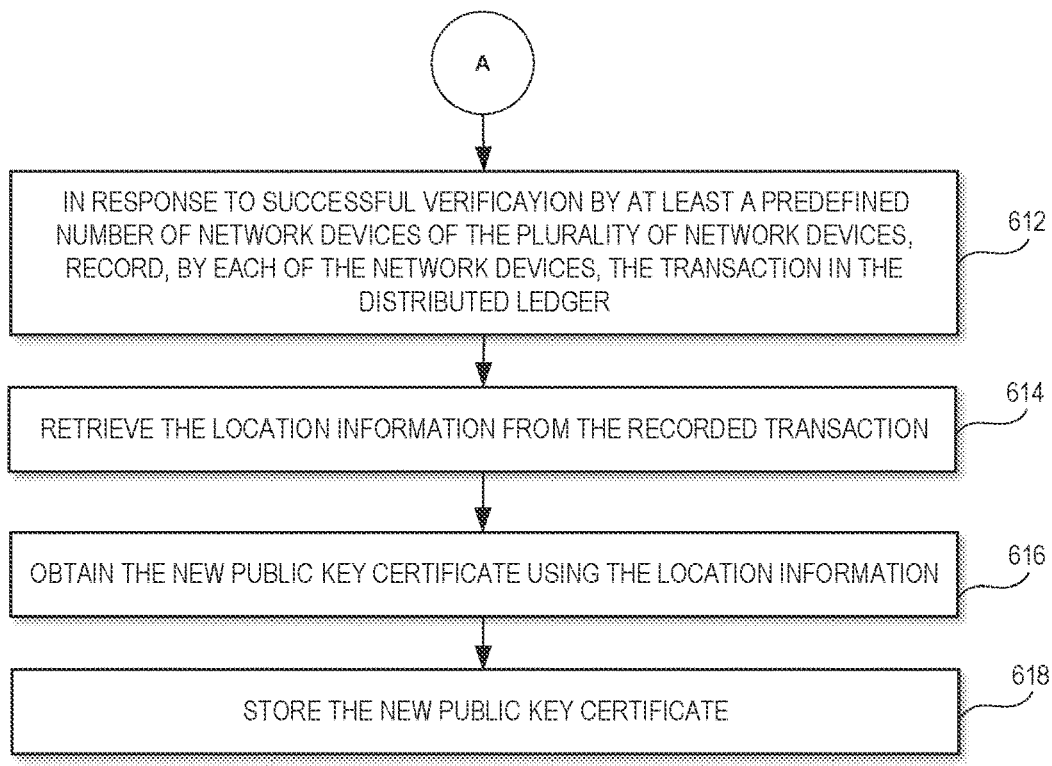
FIG. 6B is a continuation of the method of FIG. 6A.

FIG. 5 and FIGS. 6A-6B depict flowcharts illustrating example methods 500 and 600 for updating a new public key certificate in a plurality of network devices deployed in a network. In particular, the example methods include communicating, using a BC network, location information of the new public key certificate among network devices of the plurality of network devices deployed in the network. Each network device of the plurality of network devices may be a participant of the BC network. For ease of illustration, the execution of methods 500 and 600 is described with reference to the network 100 of FIG. 1. As will be appreciated, features described herein may also be applicable to network 300 of FIG. 3. In an example, the methods 500 and 600 may be executed by the BC management system 112 of the BC network 110. In some examples, the methods 500 and 600 may be executed by each participant network device 104 of the BC network 110. In an example, the methods 500 and 600 are performed by the processor 402 by executing the instructions 406-412 stored in the machine-readable storage medium 404. (FIG. 4). Additionally, implementation of methods 500 and 600 is not limited to such examples. Although the flowcharts of FIG. 5 and FIGS. 6A-6B, individually, show a specific order of performance of certain functionalities, methods 500 and 600 are not limited to such order. For example, the functionalities shown in succession in the flowcharts may be performed in a different order, may be executed concurrently or with partial concurrence, or a combination thereof.

Referring now to FIG. 5, in block 502, a transaction including location information of a new public key certificate may be received, by the BC management system 112, from the authoritative network device 104A. In some examples, the authoritative network device 104A has received the new public key certificate from an administrator. On receiving the new public key certificate, the authoritative network device 104A stores the new public key certificate on IPFS 108 and obtains the IPFS link corresponding to the new public key certificate. In the examples described herein, the location information of the new public key certificate includes the IPFS link corresponding to the new public key certificate.

On generation of the transaction, the transaction may be verified using consensus process defined in the rules or logic (included in the smart contract 116) as per blockchain protocols and specifications. In an example, the transaction may be verified by each of the network devices 104 to provide their consent.

In block 504, the transaction may be verified, using the smart contract 116, to determine whether the new public key certificate is valid. In some examples, it is verified, using the smart contract 116, whether the new public key certificate has a valid expiry date, the new public key certificate has not been revoked, and a CN of the new public key certificate matches a CN of the previously deployed public key certificate. In some examples, a basic constraint and a key usage of the new public key certificate may also be verified, as described above. In some examples, if it is not verified that new public key certificate has the valid expiry date, the new public key certificate has not been revoked, or the CN of the new public key certificate matches the CN of the previously deployed public key certificate, the new public key certificate is not valid. In such examples, the participant network device 104B do not provide its consent. In some examples, if it is verified that new public key certificate has the valid expiry date, the new public key certificate has not been revoked, and the CN of the new public key certificate matches the CN of the previously deployed public key certificate, the new public key certificate is valid.

In block 506, it may be verified, using the smart contract 116, whether the new public key certificate is different from the previously record public key certificate in the distributed ledger 114. In some examples, the new public key certificate is the same as the previously recorded public key certificate in the distributed ledger 114. In these instances, it is not verified that the new public key certificate is different from the previously recorded public key certificate. In such examples, the participant network device 104B does not provide its consent. In some examples, it is verified that the new public key certificate is different from the previously recorded public key certificate.

In some examples, it is also verified, using the smart contract 116, whether the source that had generated the transaction is a valid source, as described above.

In some examples, when it is verified that new public key certificate has the valid expiry date, the new public key certificate has not been revoked, the CN of the new public key certificate matches the CN of the previously deployed public key certificate, and the new public key certificate is different from the previously recorded public key certificate in the distributed ledger 114, the transaction is verified. In some examples, when the transaction is verified by a participant network device of the participant network devices 104B, that participant network device provides its consent. In some examples, the transaction may be verified by at least a predefined number of network devices, out of the participant network devices 104B, as defined in the logic for consensus process as per blockchain protocols and specifications.

In block 508, in response to successful verification by the at least predefined number of network devices, the consensus may be reached. Once consensus is reached, the transaction is recorded in the respective copies of the distributed ledger 114 by the participant network devices 104.

Referring to FIGS. 6A-6B, the method 600 includes certain blocks that are similar to one or more blocks described in FIG. 5, details of which are not repeated herein for the sake of brevity. By way of example, the method blocks 602 of FIG. 6A and 612 of FIG. 6B are similar to method blocks 502 and 508, respectively, of FIG. 5.

In block 602, a transaction including location information of a new public key certificate may be received from the authoritative network device 104A. In block 604, it is verified whether the new public key certificate has a valid expiry date. In instances when the expiry date is not valid ('NO' in block 604), the transaction is not verified. In instances when the expiry date is valid ('YES' in block 604), the method 600 proceeds to block 606. In block 606, it is verified whether the new public key certificate has not been revoked. In instances when the new public key certificate has been revoked ('YES' in block 606), the transaction is not verified. In instances when the new public key certificate has not been revoked ('NO' in block 606), the method 600 proceeds to block 608. In block 608, it is verified whether the CN of the new public key certificate matches the CN of the previously deployed public key certificate. In instances when the CN of the new public key certificate does not match the CN of the previously deployed public key certificate ('NO' in block 608), the transaction is not verified. In instances when the CN of the new public key certificate matches the CN of the previously deployed public key certificate ('YES' in block 608), the method 600 proceeds to block 610. In block 610, it may be verified, using the smart contract 116, whether the new public key certificate is different from the previously recorded public key certificate. In instances when the new public key certificate is the same (not different) as the previously recorded public key certificate ('NO' in block 610), the transaction is not verified. In instances when the new public key certificate is different from the previously recorded public key certificate ('YES' in block 610), the transaction is verified. In block 611, it is verified, using the smart contract 116, whether the source that had generated the transaction is a valid source. In instances when the source is not the authoritative network device 104A ('NO' in block 611), the transaction is not verified. In instances when the source is the authoritative network device 104A ('YES' in block 611), the transaction is verified. The verification of the transaction as described in blocks 604, 606, 608, 610 and 611 may be performed simultaneously or in any order of performance.

In some examples, when the transaction is successfully verified by a participant network device of the participant network devices 104B, that participant network device provides its consent. In some examples, the transaction may be verified by at least a predefined number of network devices, out of the participant network devices 104B, as defined in the logic for consensus process as per blockchain protocols and specifications.

In block 612, in response to successful verification by the at least predefined number of network devices, the consensus is reached. Once consensus is reached, the transaction is recorded in the distributed ledger 114 by each of the participant network devices 104.

In block 614, each of the participant network devices 104 may retrieve the location information from the recorded transaction in the distributed ledger 114.

In block 616, each of the participant network devices 104 may obtain the new public key certificate using the location information. In an example, each of the participant network devices 104B may access the IPFS 108 and obtain the new public key certificate using the location information (i.e., the IPFS link).

In block 618, each of the participant network devices 104 may store the new public key certificate in its TPM. This way, the new public key certificate is updated in each participant network device 104.

Figure 7:
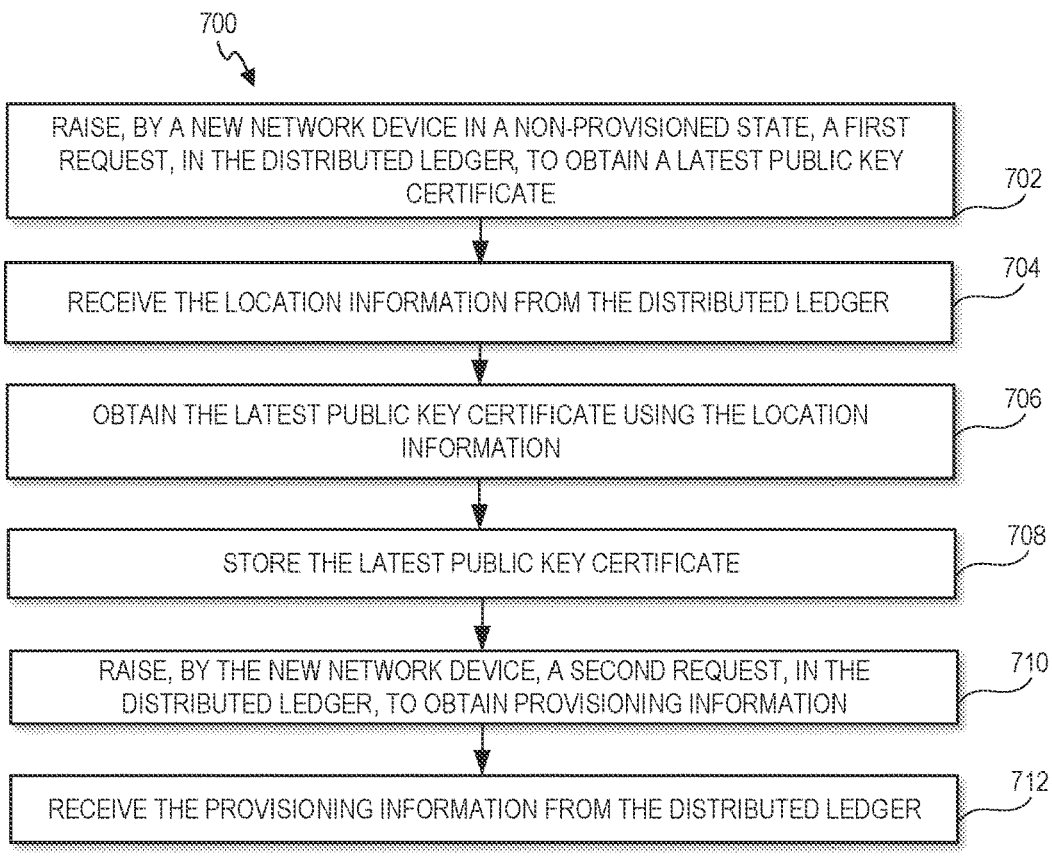
FIG. 7 is a flowchart illustrating a method for provisioning a new network device added to a network using a BC network, in accordance with an example.

FIG. 7 depicts a flowchart illustrating an example method 700 for provisioning a new network device added to a network utilizing a BC network (e.g., the BC network 110 of the network 100 in FIG. 1). In particular, the example method includes communicating, using the BC network, provisioning information to the new network device. For ease of illustration, the execution of method 700 is described with reference to the network 100 of FIG. 1. As will be appreciated, features described herein may also be applicable to network 300 of FIG. 3. In an example, the method 700 may be executed by the BC management system 112 of the BC network 110. In some examples, the method 700 may be executed by one or more participant network devices 104 of the BC network 110. In an example, the method 700 is performed by a processor by executing the instructions stored in a machine-readable storage medium. Although the flowchart of FIG. 7 shows a specific order of performance of certain functionalities, method 700 is not limited to such order. For example, the functionalities shown in succession in the flowchart may be performed in a different order, may be executed concurrently or with partial concurrence, or a combination thereof.

Referring now to FIG. 7, in block 702, the new network device in the non-provisioned state may request, in the distributed ledger 114, to obtain a latest public key certificate to be included in the TPM of the new network device. In block 704, in response to the request, the new network device may receive the location information of the latest public key certificate recorded in the distributed ledger 114. The new network device may retrieve the location information of the latest public key certificate from the distributed ledger 114. In block 706, the new network device may obtain the latest public key certificate from the IPFS 108 using the location information (i.e., the IPFS link). In block 708, the new network device may store the latest public key certificate in its TPM. In block 710, the new network device may request, in the distributed ledger 114, to obtain provisioning information. The provisioning information includes information of one of the configuration devices 106 that can provide the configuration setting information for configuring the new network device. In block 712, in response to the request, the new network device may receive the provisioning information from the distributed ledger 114. The process of providing the provisioning information in the distributed ledger 114 for the new network device is described in the details above. The new network device may then retrieve the configuration setting information from the configuration device as per the provisioning information. Upon receiving the configuration setting information from the configuration device, the new network device may get configured using the configuration setting information.

As used herein, a "computing system" may be a server, storage system, storage array, desktop or laptop computer, switch, router, or any other processing device or equipment including a processing resource. In examples described herein, a processing resource may include, for example, one processor or multiple processors included in a single computing system or distributed across multiple computing systems. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing system executing the machine-readable instructions, or remote from but accessible to the computing system (e.g., via a computer network) for execution. In the examples illustrated in FIGS. 1-3, the BC network 110, the BC management system 112, and various participant network devices 104 may each be implemented by one machine-readable storage medium, or multiple machine-readable storage media.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations

The invention claimed is:

1. A method comprising:
accessing, by a first network device that is new to a communication network and in a non-provisioned state, a blockchain network, wherein the first network device in the non-provisioned state includes a first public key certificate, and wherein the communication network comprises a plurality of network devices that participate in the blockchain network;
determining, by the first network device in the non-provisioned state, whether the first public key certificate included in the first network device is later than a second public key certificate retrieved from a distributed ledger in the blockchain network;
in response to determining that the first public key certificate is later than the second public key certificate, generating, by the first network device, a first transaction that records first location information of the first public key certificate in the distributed ledger;
obtaining, by the first network device, provisioning information from the blockchain network for placing the first network device in a provisioned state;
receiving, by the first network device, a second transaction in the distributed ledger, wherein the second transaction comprises second location information of a new public key certificate;
verifying, by the first network device using a smart contract, whether:
the new public key certificate is valid; and
the new public key certificate is different from a previously recorded public key certificate in the distributed ledger; and
in response to successful verification by at least a predefined number of network devices of a collection of network devices including the first network device and the plurality of network devices, recording, by the first network device, the second transaction in a copy of the distributed ledger in the first network device.

2. The method of claim 1, comprising:
generating, by an authoritative network device, the second transaction in the distributed ledger, wherein the authoritative network device is part of the plurality of network devices.

3. The method of claim 2, wherein the authoritative network device provides a cloud-based service in the communication network, and the provisioning information is provided by the cloud-based service that participates in the blockchain network.

4. The method of claim 2, comprising:
receiving, by the authoritative network device, the new public key certificate from an administrator; and
storing, by the authoritative network device, the new public key certificate in an Inter Planetary File System (IPFS) prior to generating the second transaction in the distributed ledger.

5. The method of claim 4, wherein the second location information of the new public key certificate comprises an IPFS link corresponding to the new public key certificate.

6. The method of claim 1, wherein the verifying of whether the new public key certificate is valid comprises verifying whether:
the new public key certificate has a valid expiry date;
the new public key certificate has not been revoked; and a common name (CN) of the new public key certificate matches a CN of a previously deployed public key certificate in each of the plurality of network devices.

7. The method of claim 1, wherein the verifying using the smart contract comprises verifying whether a source that generated the second transaction is a valid source.

8. The method of claim 1, comprising:
retrieving, by the first network device, the second location information of the new public key certificate from the second transaction recorded in the distributed ledger;
obtaining, by the first network device, the new public key certificate using the second location information; and
storing, by the first network device, the new public key certificate.

9. The method of claim 1, wherein the new public key certificate comprises a root certificate authority (CA) certificate or an intermediate certificate.

10. The method of claim 1, wherein the provisioning information is determined by a blockchain management system using the smart contract.

11. The method of claim 10, wherein the provisioning information comprises information about a configuration device, and the method further comprises:
retrieving, by the first network device, configuration setting information from the configuration device; and
configuring the first network device using the configuration setting information.

12. A blockchain network comprising:
a plurality of network devices deployed in a communication network, wherein the plurality of network devices are participants in the blockchain network;
a further network device comprising a processor and a machine-readable medium storing instructions that, when executed on the processor, cause the further network device to:
access, by the further network device that is new to the communication network and in a non-provisioned state, the blockchain network, wherein the further network device in the non-provisioned state includes a first public key certificate;
determine, by the further network device in the non-provisioned state, whether the first public key certificate included in the further network device is later than a second public key certificate retrieved from a distributed ledger in the blockchain network;
in response to determining that the first public key certificate is later than the second public key certificate, generate a first transaction that records first location information of the first public key certificate in the distributed ledger;
obtain provisioning information from the blockchain network for placing the further network device in a provisioned state;
receive, at the further network device, a second transaction in the distributed ledger, wherein the second transaction comprises second location information of a new public key certificate;
verify, using a smart contract, whether:
the new public key certificate has a valid expiry date;
the new public key certificate has not been revoked;
a common name (CN) of the new public key certificate matches a CN of a previously deployed public key certificate in each of the plurality of network devices; and
the new public key certificate is different from a previously recorded public key certificate in the distributed ledger; and in response to successful verification, provide, from the further network device, a consent to record the second transaction in the distributed ledger.

13. The blockchain network of claim 12, wherein the plurality of network devices comprises an authoritative network device to generate the second transaction.

14. The blockchain network of claim 13, wherein the authoritative network device provides a cloud-based service in the communication network, and the provisioning information is provided by the cloud-based service that participates in the blockchain network.

15. The blockchain network of claim 12, wherein the second location information of the new public key certificate comprises an Inter Planetary File System (IPFS) link corresponding to the new public key certificate stored in an IPFS.

16. The blockchain network of claim 12, wherein the instructions, when executed on the processor, cause the further network device to:
verify, using the smart contract, whether a source that generated the second transaction is a valid source.

17. The blockchain network of claim 12, wherein the instructions, when executed on the processor, cause the further network device to:
in response to at least a predefined number of network devices of a collection of network devices including the further network device and the plurality of network devices providing consent to record the second transaction, record the second transaction in a copy of the distributed ledger in the further network device.

18. The blockchain network of claim 12, wherein the instructions, when executed on the processor, cause the further network device to:
retrieve the second location information of the new public key certificate from the second transaction recorded in the distributed ledger;
obtain the new public key certificate using the second location information; and
store the new public key certificate.

19. The blockchain network of claim 12, wherein the new public key certificate comprises a root certificate authority (CA) certificate or an intermediate certificate.

20. A non-transitory machine-readable storage medium comprising instructions that upon execution cause a first network device to:
access, by the first network device that is new to a communication network and in a non-provisioned state, a blockchain network, wherein the first network device in the non-provisioned state includes a first public key certificate, and wherein the communication network comprises a plurality of network devices that are participants in the blockchain network;
determine, by the first network device in the non-provisioned state, whether the first public key certificate included in the first network device is later than a second public key certificate retrieved from a distributed ledger in the blockchain network;
in response to determining that the first public key certificate is later than the second public key certificate, generate, at the first network device, a first transaction that records first location information of the first public key certificate in the distributed ledger;
obtain provisioning information from the blockchain network for placing the first network device in a provisioned state;

receive, at the first network device, a second transaction in the distributed ledger, wherein the second transaction comprises second location information of a new public key certificate;
verify, by the first network device using a smart contract, whether:
   the new public key certificate is valid; and
   the new public key certificate is different from a previously recorded public key certificate in the distributed ledger; and
in response to successful verification by at least a predefined number of network devices of a collection of network devices including the first network device and the plurality of network devices, record, by the first network device, the second transaction in a copy of the distributed ledger in the first network device.

\* \* \* \* \*